United States Patent [19]
Westbrook, Sr.

[11] 3,950,755
[45] Apr. 13, 1976

[54] RADIO CONTROL FOR PRESS
[75] Inventor: Robert L. Westbrook, Sr., Cincinnati, Ohio
[73] Assignee: Rotex, Inc., Cincinnati, Ohio
[22] Filed: Mar. 11, 1975
[21] Appl. No.: 557,266

[52] U.S. Cl. .................. 343/225; 325/37; 325/118; 340/147 MT
[51] Int. Cl.² ...................... H04B 7/00; H04Q 7/00
[58] Field of Search ............. 343/225; 340/147 MT; 325/37, 118, 302, 51; 192/129 R, 129 N, 130, 131; 318/16

[56] References Cited
UNITED STATES PATENTS

| | | | |
|---|---|---|---|
| 786,473 | 4/1905 | Wenigmann | 192/131 H |
| 1,127,356 | 2/1915 | Gale | 192/131 R |
| 1,276,962 | 8/1918 | Roberts | 192/131 R |
| 2,013,441 | 9/1935 | Goff | 192/131 H |
| 2,341,689 | 2/1944 | Bryson | 192/131 R |
| 2,543,789 | 3/1951 | MacMillan | 318/16 |
| 2,594,520 | 4/1952 | Tiedman | 192/131 R |
| 2,913,581 | 11/1959 | Simonton | 192/129 A |
| 2,963,627 | 12/1960 | Buchsbaum | 343/225 |
| 3,011,610 | 12/1961 | Stiebel | 192/131 R |
| 3,605,969 | 9/1971 | Cornu | 192/131 R |

Primary Examiner—Glen R. Swann, III
Attorney, Agent, or Firm—Wood, Herron & Evans

[57] ABSTRACT

A radio control for a press includes a radio receiver connected to actuate the press upon receipt of a predetermined radio signal, and a belt-mounted transmitter worn by the press operator. Two series-connected manually operated transmitter actuating buttons are mounted on the belt at opposite sides of the operator. The buttons must be simultaneously pushed to actuate the transmitter and, since the buttons are on opposite sides of the operator, he must use both hands to push them at the same time. This precludes the possibility that an operator's hands will be in the danger zone of the press during operation, while at the same time providing relatively unlimited freedom of position for the operator. Provisions are made for two or more receivers and transmitters to equally protect two or more operators, and for overriding the belt transmitter in the event of special workpiece set ups.

20 Claims, 3 Drawing Figures

RADIO CONTROL FOR PRESS

BACKGROUND OF THE INVENTION

This invention relates to press controls and more particularly to safety controls operable to actuate a press only when the operator's hands are in positions safely away from the press.

Power operated press devices, such as press brakes and the like, have always presented a threat of injury to press operators. Such devices typically include some form of platen or work support bed and movable member for bending or otherwise treating the workpiece by engagement therewith. Normally, a press operator manually positions the workpiece into proper starting position. When the press is then actuated, the movable member moves against the workpiece with great force. Should an operator's hand remain between the work and the movable member, severe injury results.

Accordingly, there now exist safety regulations requiring control means which will preclude press operation unless an operator's hands are in a safe position. One popular system heretofore used included two spaced press actuating buttons disposed on the press in a safe position. The buttons are wired so that they must be pushed simultaneously in order to actuate the press, and they are spaced such that one hand must be used for each. Both of the operator's hands must thus be in a safe position on the buttons before the press can be actuated.

Another system heretofore utilized included wrist or hand cuffs worn by the operator and connected to a withdrawing device for pulling the cuffs, and the operator's hands, away from the danger zone when the press was actuated. Switches associated with the cuffs precluded press operation unless the cuffs were actually worn.

While such features make injury less likely, each has certain disadvantages which are now desired to be overcome. For example, these systems restrict the movement of the operator, who is required to be in a certain position, either to simultaneously push two buttons or to wear the cuffs.

It has thus been a primary object of the invention to provide press control apparatus which does not restrict an operator's position during operation, yet which requires a simultaneous press actuating movement of both hands of the operator at a position safely removed from the press danger zone.

A further objective of the invention has been to provide an improved press control actuating means having no physical connection with the press and yet requiring operation by both hands of an operator at a position safely removed from the danger zone.

A further objective of the invention has been to provide plural improved press control actuating means having no physical connection with the press and requiring simultaneous operation by both hands of each of two or more press operators at a position safely removed from the danger zone.

SUMMARY OF THE INVENTION

To these ends, a preferred embodiment of the invention includes a press, a radio receiver connected to actuate the press upon receipt of a predetermined radio signal, and a transmitter mounted on a belt worn by a press operator for signalling the receiver to actuate the press. Two series connected transmitter control pushbuttons are also mounted on the belt and both must be pushed simultaneously to actuate the transmitter. The buttons are spaced such that two hands are required to simultaneously push them, thereby assuming safe hand position when the press is actuated.

Once the press has been actuated by the radio transmission as initiated by the buttons, the work engaging member approaches the workpiece but stops at a "pinch point" removed therefrom by about one-fourth of an inch or some point of approach that is too small for the inadvertent placement of a finger or hand, for example, in the danger zone between the workpiece or supporting bed and the movable work engaging member. At the pinch point, the workpiece can be adjusted incrementally for set up, but the danger to the operator has been negated.

Once the press platen has reached the pinch point, the press is thereafter operated by a foot pedal electrically connected to actuate the press, to engage and treat the workpiece. Press control normally thus comprises a combination of radio transmission and following foot pedal movement. This insures operator safely during the time when it is possible to inadvertently place a hand or finger in a danger zone, and yet allows the hands to be free for work placement or set up after the press has reached a safe pinch point.

Other features of the preferred embodiment include switch means in the actuating circuit for overriding the radio receiver contacts and for providing complete press control by foot pedal, exclusive of any radio transmission. This allows an operator to incrementally approach non-typical workpieces with the movable press member, while using both hands to guide or set up the piece prior to treatment.

To provide equal safety for two or more press operators, additional belts, transmitters, and receivers are provided. Where belts are used, for example, a second belt-mounted transmitter and two transmitter actuating push buttons are provided. A second radio receiver is connected such that both radios must receive a signal before the press can be actuated. The signals differ and, as a result, simultaneous pressing of all four push buttons by the respective hands of each operator is thus required to actuate the press to the pinch point. A switch is provided to override one set of radio contacts if operation by only one operator is desired.

Since the press is actuated by transmitter actuation buttons mounted on the operator, his freedom of movement is unrestricted. He is not required to be in any particular position to operate the press, to the pinch point. Further, he is only required to thereafter be at a location where he can reach the foot pedal which, of course, he can move to any desirable position.

BRIEF DESCRIPTION OF THE DRAWING

These and other objects and advantages will readily appear from the following written description and drawings in which.

DESCRIPTION OF THE PREFERRED EMBODIMENTS

Figure 1:
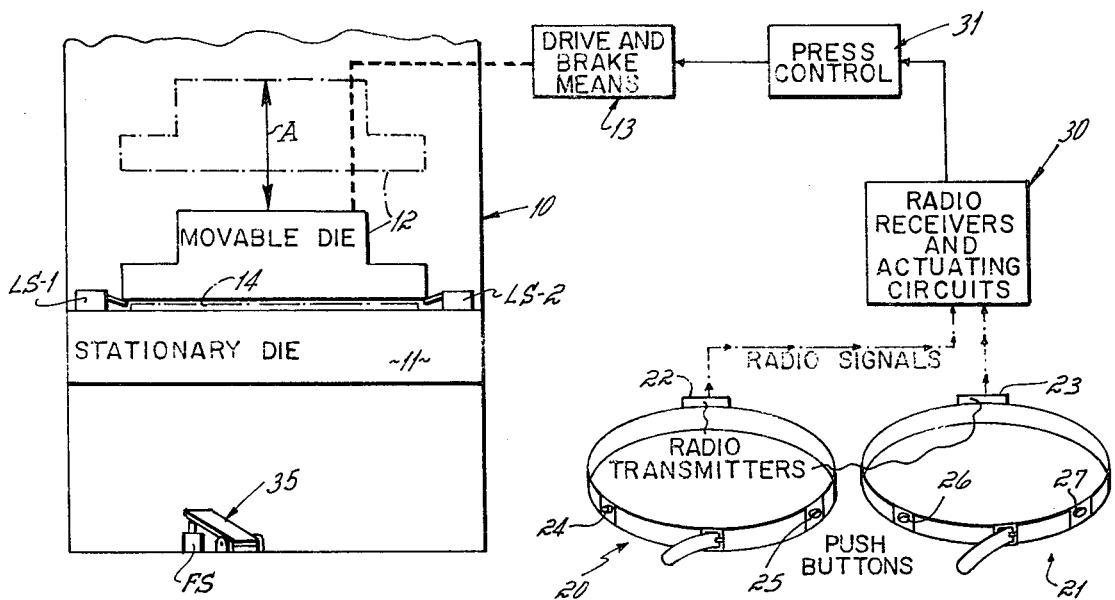
FIG. 1 is a diagramatic view of the invention.

Turning now to the drawings, the press contemplated by the invention is diagramatically shown at 10 in FIG. 1 thereof. The press includes a workpiece support such as a supporting bed 11, a movable die or workpiece engaging member 12, and drive and brake means 13 for moving the movable die 12 toward and away from the bed 11 in reciprocal directions as indicated by the arrow A. The press 10 is only diagramatically shown and it should be appreciated that press 10 might comprise a press brake, a punch press, or any other form of press having a movable member for engaging and treating workpieces.

The press depicted at 10 is operable to engage a workpiece, such as that indicated at 14, and to bend, as in the case of a press brake, the work piece to a desired form.

The drive and brake means 13 comprises any suitable means for moving and for braking the die 12. Preferably, the drive means comprises a motor-driven fly wheel and a pneumatic clutch and brake apparatus for selectively connecting the fly wheel to a rotatable die driving shaft, or for braking the shaft. None of these features are shown as they are typical of the prior art.

In FIG. 1, the movable die 12 is shown in its pinch point position wherein the movable die has been moved from its retracted position (shown in phantom in FIG. 1) to its pinch point position as shown in solid lines in FIG. 1. In this pinch point position, the movable die is slightly spaced from a workpiece 14 at a distance of approximately one-fourth inch. This spacing allows the workpiece to be moved with respect to its supporting bed 11 and the movable die 12 in order that the work may be precisely placed for subsequent engagement by the movable die. The spacing of approximately one-fourth inch, however, is not large enough for the insertion of hand or fingers or the like between the movable die 12 and the workpiece 14.

For descriptive purposes, the area of the press between the movable die and the supporting bed 11, including the spaces between the movable die and the workpiece 14, are defined as a danger zone. As previously stated, it is desired to provide a control for preventing press operation until the hands of the operator are removed from such danger zone. While the invention provides a safe press control for use by one operator, in some instances operation of the press by two or more persons is desired and it is desirable to insure the safety of each operator. The invention will thus be described in connection with two operators, but it shall be appreciated that one operator, or more than two operators, could be accommodated.

For two operators, press actuating belts 20 and 21 are provided, one for each operator. Each of these belts is provided with respective radio transmitters 22 and 23, and with respective sets of push-button controls 24, 25 and 26, 27. The respective push-buttons are connected so that each button of a set must be simultaneously pushed in order to actuate the radio transmitter on the belt with which the buttons are associated. When the buttons on the respective belts are simultaneously pushed, radio signals are transmitted from the radio transmitters 22 and 23 to respective radio receivers which are connected in a press actuating circuit 30 to energize a press control 31 and thereby actuate the drive means to move the movable die 12 from its retracted position to its pinch point position.

As will later be explained, movement of the movable die from its pinch point position into engagement with the workpiece 14 will normally be controlled by actuation of a foot pedal 35 which is adapted to close a foot switch FS connected in the press actuating circuit 30.

As will also be explained, means are provided in the press actuating circuit 30 for selecting operation by one or two of the operating belts, depending on the number of operators required for a particular operation. In the instance where two operators and belts are utilized, the invention contemplates means for prohibiting press actuation unless all push-buttons 24–27 on both belts are simultaneously closed to actuate the respective radio transmitters. Of course, provisions for more than two belts could easily be made without departing from the scope of the invention.

Figure 2:
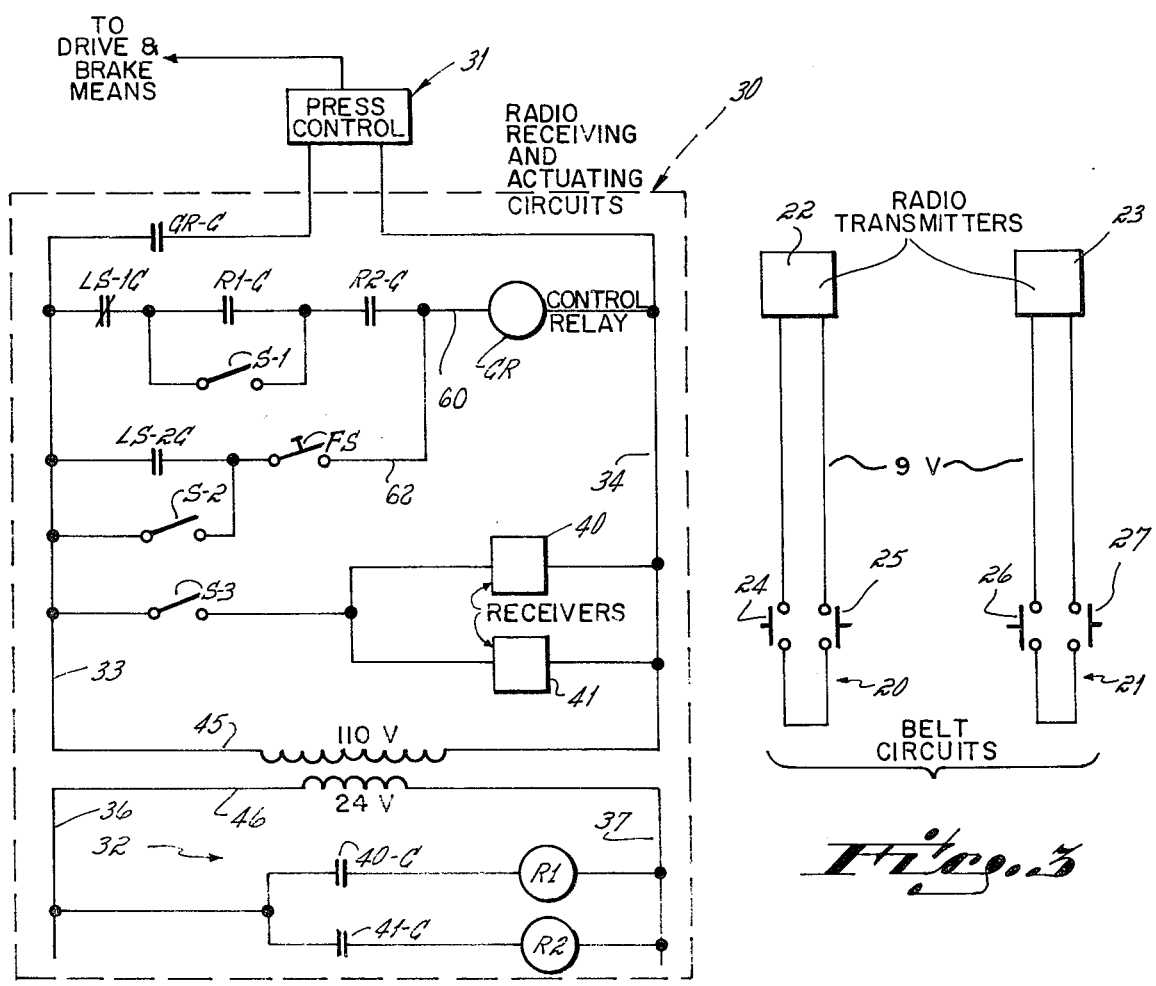
FIG. 2 is a circuit diagram of the control actuating circuit.
Figure 3:
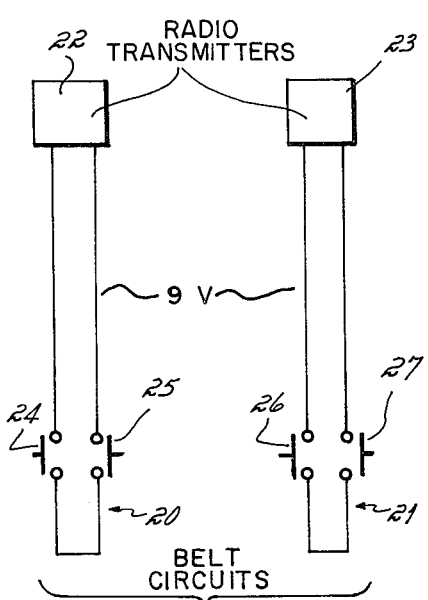
FIG. 3 is a circuit diagram of the two belt actuators.

Turning now to FIGS. 2 and 3, these Figures show schematic circuit diagrams for the actuating circuit for energizing the press control and for each of the two belts respectively. Looking first at FIG. 3, there is disclosed therein a separate wiring diagram for each of the two belts 20 and 21. As shown, each belt has respective radio transmitters 22 and 23. The respective push-button controls or contacts 24, 25 and 26, 27 are serially wired to the respective transmitters such that the respective transmitters cannot be actuated unless each of its respective push-buttons on the belt on which the transmitter is mounted are closed to close the respective transmitter circuits.

Each of the transmitters 22 and 23, may be of any suitable type. One such transmitter which has been found to be suitable is the transmitter manufactured by the Telectron Corporation, a wholly owned subsidiary of Pakco Company, Inc., and currently having a place of business at 4050 SW 14th Avenue, Ft. Lauderdale, Fla. This transmitter is marketed by this company under model No. T-21. These transmitters are powered by a 22½ volt battery and have a variable radio frequency capability with two tunable audio coils for the purpose of simultaneously transmitting two signals having different radio frequencies. Transmitters 22 and 23 differ only with regard to these features, each transmitter being tuned to generate signals of different frequencies than those generated by the other transmitter.

FIG. 2 shows a schematic circuit diagram of a press actuating circuit 30 and a radio relay circuit 32. In a preferred embodiment, a 220 volt power input is connected to a transformer winding and a 110 volt coil is associated with this input to provide 110 volt power for the circuit 30 in line 45 thereof. Likewise, a 24 volt coil is associated with a winding in the 110 volt line 45 to provide 24 volt power, through power line 46, to the radio relay circuit 32. The 220 volt input and the various elements of the transformers, apart from the 110 volt winding and the 24 volt winding, may be of any suitable structure and are not shown in detail in FIG. 2 beyond the coils as shown.

The control circuit 30 provides means for insuring that the hands of each operator are safely positioned on the push buttons, mounted by the respective belts at each operators waist, at the time that the movable die 12 is actuated to a pinch point position. More particularly, radio receivers 40 and 41 are connected between the lines 33 and 34 of the circuit ladder diagram shown in FIG. 2. The receivers can be turned on by the closing of a switch S-3, which is a key actuated switch positioned in a control panel for opening or closing by the insertion of a key when the press is to be operated.

Each of the receivers 40 and 41 may be of any suitable type. More particularly, however, receivers, manufactured by the Telectron Corporation, identified above, and sold under model No. R-40, have been found to be suitable. Each of these receivers is constructed to simultaneously receive two signals of different radio frequencies. More particularly, receiver 40 is tuned to receive the two signals of different radio frequencies which are transmitted by the transmitter 22. Receiver 41 is tuned to receive the two signals of further different frequencies transmitted by the transmitter 23. Each receiver has respective contacts 40-C and 41-C which are connected to respective relays R1 and R2 between the lines 36 and 37 of the radio relay circuit 32 shown in FIG. 2. The contacts 40-C and 41-C are connected in the radio receivers 40 and 41 so that they are respectively closed only when the respective receivers simultaneously receive both of the transmitted frequencies from the associated transmitters 22 or 23. Thus contacts 40-C are closed only when receiver 40 simultaneously receives two signals of different predetermined radio frequencies from the transmitter 22. Likewise, contacts 41-C are closed only when the receiver 41 simultaneously receives two signals of further different predetermined radio frequencies from the transmitter 23. Since the transmitters 22 and 23 cannot be actuated to transmit the respective frequencies unless each of the respective push-buttons 24, 25 and 26, 27 are closed, the contacts 40-C and 41-C cannot be closed unless each of the push-buttons are simultaneously closed.

The relays R1 and R2 have contacts R1-C and R2-C in line 60. These contacts R1-C and R2-C are serially connected, as shown, to a control relay CR (also in line 60) and are further in series with the normally closed contacts LS-1C of limit switch LS-1. The control relay CR has normally open contacts CR-C in line 61 of the circuit, connected serially with the press control 31 between the lines 33 and 34 of the circuit 30. The press control 31 thus cannot be actuated to actuate the drive means 13 unless the contacts CR-C are closed. The details of the press control 31 are not shown as they may be of any suitable type for controlling the pneumatic clutch and brake of the drive means 13. Driving actuation is initiated by the conduction of an electric signal to the press control 31 through the contacts CR-C.

Since the contacts R1-C and R2-C in line 60 are serially connected with the control relay CR, the contacts CR-C will not be closed unless both the contacts R1-C and R2-C are closed. Thus, it should be appreciated that only by the simultaneous closing of all push-buttons 24 through 27, can the press control 31 be actuated to actuate the drive means to move the movable die 12 toward its pinch point position.

The press 10 as shown in FIG. 1 is provided with limit switches LS-1 and LS-2 as shown. Limit switch contacts LS-1C are connected in line 60 of the press actuating circuit 30 and are normally closed. Contacts LS-2C are connected in a line 62 of the circuit 30 and are normally open. Both of these limit switches are positioned so as to be switched by the movable die member 12 or structure extending therefrom. Switch LS-1 is positioned so that its normally closed contacts LS-1C are opened when the movable die 12 reaches its pinch point as shown in FIG. 1. Switch LS-2 is positioned so its normally open contacts LS-2C are closed when the movable die 12 reaches its pinch point position.

Alternately, switch LS-1 can be positioned for operation by a cam, for example, on a press driving shaft (not shown); the switch and cam positioned so that the normally closed switch is opened by the cam when the press reaches the pinch point.

When radio receivers are actuated so as to close the contacts 40-C and 41-C, and the contacts R1-C and R2-C in line 60 are closed, the control relay contacts CR-C are closed and the press control is thereby actuated by the belt transmitters to move the movable die 12 to its pinch point position. At this time, the contacts LS-1C in line 60 are opened, contacts LS-2C in line 62 are closed, and the control relay drops out, opening contacts CR-C and halting the press member 12. The workpiece 14 can then be adjusted if necessary for proper position beneath the movable die 12. Thereafter, the foot pedal 35 is pushed to close the foot switch FS, having contacts in line 62. Since the contacts LS-2C, which are now closed, and the foot switch FS are serially connected through line 62 to the control relay in line 60, the control relay is thus energized to close the contacts CR-C in line 61. Thereby, the press control 31 is then actuated to operate the drive means to move the movable die 12 into treating engagement with the workpiece 14.

Thereafter, the foot switch is released, the control relay is dropped out of the circuit, the contact CR-C is opened and the movable die can be moved by the drive means into its retracted position shown in phantom in FIG. 1.

Means are provided in the circuit 30 to provide for variations of press operation control. For example, a key operated switch S-1, also located in a press control panel (not shown) is connected around the contact R1-C of the radio relay. When it is desired that only one operator control the operation of the press, switch S-1 is closed. It is thus only necessary to close the contacts R2-C in order to energize the control relay CR. Only operation of a single radio receiver 41 is thus required, closing the contact 41-C, energizing the relay R2, and closing contacts R2-C in order to actuate the movable die 12 to its pinch point. Further, it will be appreciated that only the belt 21 and its associated transmitter 23 is required for this operation. By closing switch S-1, the press can thus be set up for operation by a single operator.

Further, and in the event that it is desired that an operator's hands be free during movement of the movable die 12 from its retracted position to a position adjacent the workpiece (in order to provide for the exact set up of non-typical workpieces), a switch S-2 is connected around the normally opened contact LS-2C. Switch S-2 is also a key operated switch located on a press control panel. When closed, switch S-2 connects the foot operated switch FS, in line 62, in series with the control relay CR. Thereby, the relay CR can be energized and contacts CR-C closed merely by operation of the foot switch, and independently of the contacts R1-C and R2-C. Thus, when switch S-2 is closed, the movable die 12 can be moved from its retracted position toward or into engagement with the workpiece merely by operation of the foot switch, and without regard to operation of the transmitters 22, 23. (For such operation, the die 12 is normally "inched down", i.e., moved incrementally toward the workpiece by foot pedal control while the workpiece is adjusted.)

From the above, it can be appreciated that when the circuit 30 is switched to provide for control by either or both of the belts 20 or 21 and their associated transmitters, the operator or operators must have both hands safely positioned at the respective push-buttons on the two belts before the movable die can be actuated to pinch point position. Operator safety is thereby insured and yet, since the radio transmitters have an effective range of approximately 50 feet, the operator's movements are relatively unrestricted. Movement of the die 12 to treat the workpiece is controlled by the foot pedal 35 which can be placed in any convenient position. Further, the invention contemplates switching means by which the press can be controlled by one or more belts, or by a foot pedal independently of the belt controls such as, for example, where a nontypical workpiece is to be set up by "inching" a movable die toward it in incremental movements.

These and other objects and advantages will become readily apparent to those of ordinary skill in the art without departing from the scope of the invention, and the applicant intends to be bound only by the claims appended hereto.

I claim:

1. Apparatus for actuating a press or the like including,
   a radio receiver connected to means for actuating said press upon receipt of a predetermined radio signal,
   a belt adapted to be worn by a press operator,
   a radio transmitter mounted on said belt, said transmitter adapted upon actuation to transmit said predetermined signal, and
   two sets of manually operable contacts connected to said transmitter for actuating said transmitter to transmit said signal when said contacts are manually and simultaneously closed,
   said two sets of contacts being mounted on said belt in spaced apart positions, such that they are not in a position to be simultaneously operated with one hand.

2. Apparatus as in claim 1 wherein said press has a stationary member and a movable member movable toward said stationary member and a workpiece therebetween, said movable member and said stationary member defining therebetween a danger zone,
   said two sets of contacts being mounted on said belt in spaced apart positions to preclude the presence of an operator's hands or fingers in said danger zone, for any ordinary position of the operator, when said two sets of contacts are manually and simultaneously actuated.

3. Apparatus as in claim 2 wherein said two sets of contacts are respectively mounted so that when an operator is wearing said belt, said sets of contacts are on opposite sides of the operator.

4. Apparatus as in claim 1 wherein said press includes a work support and a movable member movable from a retracted position toward said work support and a workpiece thereon, said movable member being movable toward said workpiece from said retracted position to a pinch point position at which said movable member does not engage said workpiece, but is so closely adjacent to it as to preclude the insertion of a press operator's fingers between the movable member and the workpiece,
   said apparatus further including a foot pedal actuated switch connected to said actuating means for actuating said movable member from said pinch point position only, to engage and treat said workpiece, independently of the position of said contacts on said belt.

5. Apparatus as in claim 4 including overriding circuit means for permitting actuation of said movable member from said retracted position to a position engaged with said workpiece by said foot pedal actuated switch independently of the position of said belt mounted contacts.

6. Apparatus as in claim 1 wherein said transmitter has means for transmitting two signals of different radio frequency, and wherein said receiver is actuated to actuate the press only upon receipt of both signals.

7. Apparatus as in claim 1 including,
   a second radio receiver connected to means for actuating said press upon receipt of a second predetermined radio signal which is different than the first mentioned signal,
   the two receivers being connected to said means for actuating said press brake so that press operation is precluded unless both receivers simultaneously receive the respective predetermined radio signals, and further including
   a second belt,
   a second transmitter for transmitting said second predetermined radio signal, and
   two additional sets of contacts mounted on said second belt and connected to said second transmitter to actuate said second transmitter when both additional sets of contacts on said second belt are manually and simultaneously closed,
   said two additional sets of contacts on said second belt being mounted thereon in spaced apart relationship.

8. Apparatus as in claim 7 wherein each transmitter includes means for transmitting two signals of differing radio frequency, the frequencies of the signals of one transmitter differing from the frequency of the signals of the other transmitter,
   and wherein each receiver is connected to means for actuating said press only when each receiver receives two different signals simultaneously with the receipt of two further different signals by the other receiver.

9. Apparatus for controlling a press having a press control circuit, a work support, and a press member movable toward said work support and defining a danger zone therebetween, said apparatus including,
   at least one radio receiver, said receiver connected to means for actuating said press control circuit to operate said press upon receipt of a predetermined radio signal,
   at least one radio transmitter,
   two sets of transmitter actuating contacts connected to actuate said transmitter to transmit a radio signal to said receiver when said contacts are manually and simultaneously closed,
   a support member adapted to be worn by a press operator, and
   said radio transmitter and said two sets of contacts being mounted on said support member, said sets of contacts being spaced apart in order that both sets are not in a position to be simultaneously operated with one hand.

10. Apparatus as in claim 9 wherein said support member comprises a belt adapted to be worn about the waist of an operator, said sets of contacts mounted on said belt so as to be disposed on opposite sides of an operator wearing said belt.

11. Apparatus as in claim 10 further including, a second radio receiver connected to means for actuating said press control circuit upon receipt of a different predetermined radio signal, the actuation means of each receiver being connected so that both receivers are required to be operated before said press control circuit is actuated, and a second radio transmitter and two additional sets of controls connected to actuate said second transmitter to transmit said different radio signal to said second receiver when said additional sets of contact are manually and simultaneously closed, said second transmitter and said two additional sets of contacts being mounted on a second belt adapted to be worn by a second operator.

12. Apparatus as in claim 11 wherein said additional sets of contacts are respectively disposed on opposite sides of said second operator when said belt is worn.

13. Apparatus as in claim 12 wherein each transmitter and receiver have respective means for transmitting and for receiving two predetermined signals of different radio frequency, said receivers connected to actuate said press control circuit only when each receiver receives two predetermined signals differing in frequency from those signals received by the other receiver.

14. Apparatus for controlling a press brake or the like having a work support, a member movable toward and away from said support and any workpiece thereon, and motion control means for moving said movable member, said apparatus comprising, a first radio receiver, first circuit means for actuating said motion control means to move said movable member in response to receipt of a predetermined radio signal by said receiver, a transmitter spaced from said receiver, two manually operable sets of contacts connected to said transmitter for actuating said transmitter to transmit said predetermined signal to said receiver when said contacts are closed simultaneously, said transmitter and said two sets of contacts being mounted upon a support member, and said two sets of contacts being spaced apart so that both sets are not in a position to be simultaneously operated with one hand.

15. Apparatus as in claim 14 wherein said movable member is moved to a pinch point, approximately one-fourth inch away from a workpiece, upon actuation of said motion control means by said receiver, said first circuit means including first normally open relay contacts which are closed upon receipt of a predetermined signal by said receiver, and a first normally closed limit switch positioned to open upon arrival of said movable member at said pinch point in order to open said circuit means and stop said movable member.

16. Apparatus as in claim 15 including second circuit means for actuating said motion control means to move said movable member from said pinch point against said workpiece to treat said workpiece, said second circuit means including a normally open limit switch positioned on said press to be closed only upon arrival of said movable member at said pinch point, and a foot operated switch serially connected with said second limit switch for closing said second circuit to operate said movable member independently of the operation of said radio transmitter.

17. Apparatus as in claim 16 wherein said press is operated by two operators and further including a second radio receiver, a second radio transmitter, third and fourth manually operable contacts connected to said second transmitter for actuating said second transmitter to transmit a second predetermined signal to said second radio receiver when said third and fourth sets are closed simultaneously, said second transmitter and said third and fourth manually operable sets of contacts being mounted upon a second support member adapted to be carried by a second press operator, said third and fourth sets of contacts being mounted such that one set is spaced from the other to preclude operation of both with one hand, and said second receiver being connected to close second normally open contacts, which serially connected to the first normally open contacts, in said first circuit means in order to close said first circuit to actuate said press in response to the simultaneous receipt by each of said receivers of said first and second predetermined signals, respectively.

18. Apparatus as in claim 17 including switch means for selectively overriding one of said first or second normally open relay contacts when press operation by one operator is desired.

19. Apparatus as in claim 18 further including a third circuit for actuating said motion control means, said third circuit including said foot switch and being operable to override both of said normally open relay contacts when complete press operation by said foot switch is desired.

20. Apparatus for actuating a press or the like comprising, a plurality of radio receivers connected to means for actuating said press upon the simultaneous receipt by each receiver of respective predetermined radio signals, a plurality of belts, each corresponding to one of said receivers and adapted to be worn by respective press operators, a radio transmitter mounted on each of said belts, each of said transmitters adapted upon actuation to transmit one of said respective predetermined signals, and two sets of manually operable contacts connected to each of said respective transmitters for actuating the respective transmitters to transmit its respective predetermined radio signal when said contacts are manually and simultaneously closed, said respective sets of contacts being mounted on each of said belts in spaced apart positions, such that they are not in a position to be simultaneously operated with one hand.

* * * * *